W. C. NEWBOLD AND G. E. LENTZ.
TRANSMISSION BAND.
APPLICATION FILED JUNE 18, 1919.
1,379,647.
Patented May 31, 1921.
2 SHEETS—SHEET 1.
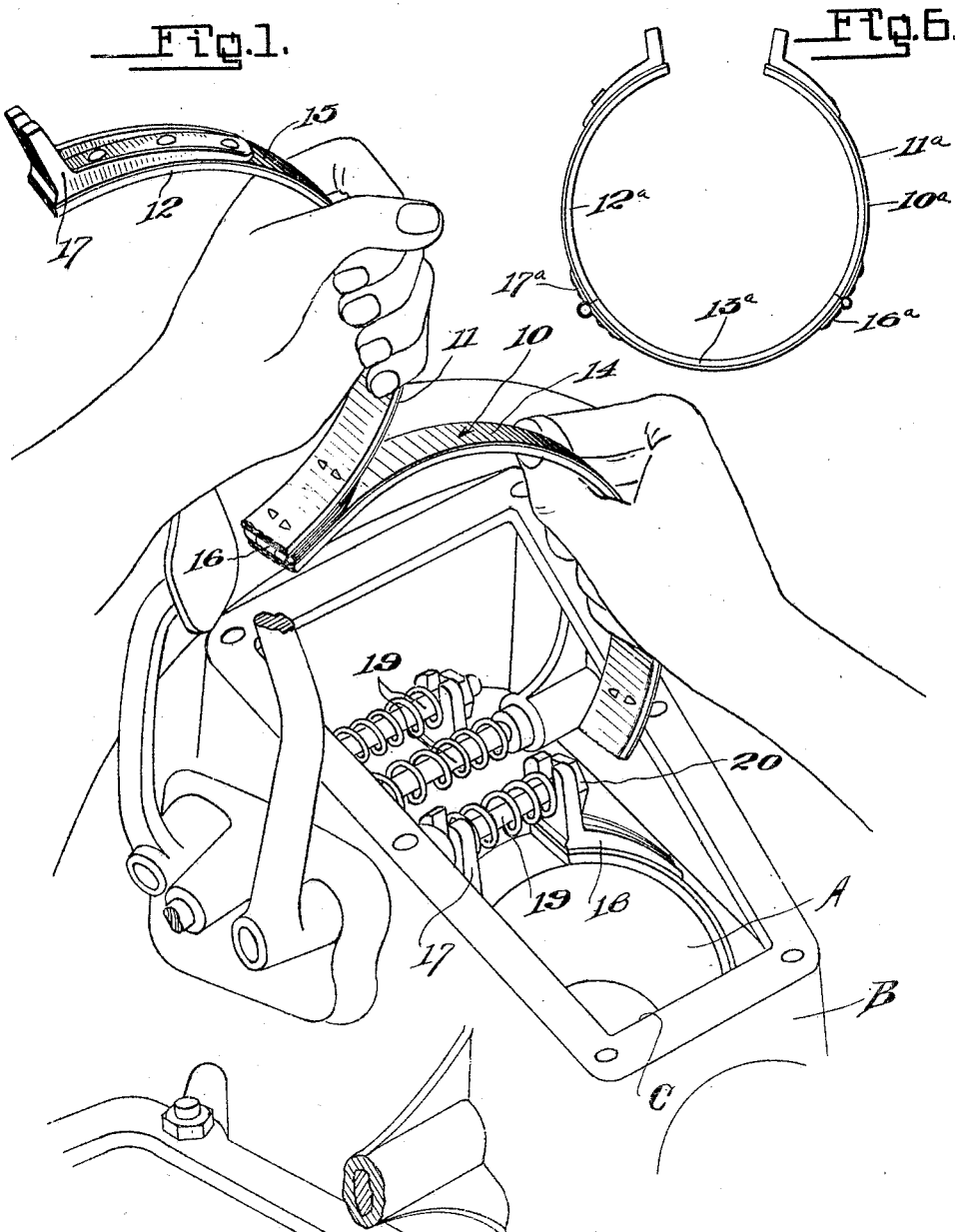
Inventors
William C. Newbold and
George E. Lentz
By Lancaster and Allwine
their Attorneys

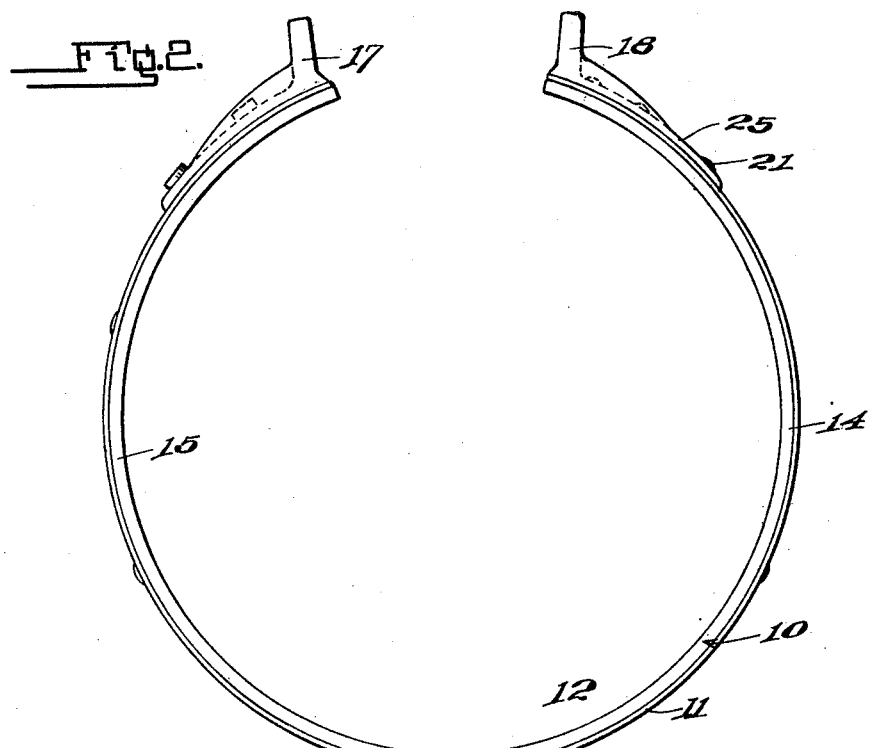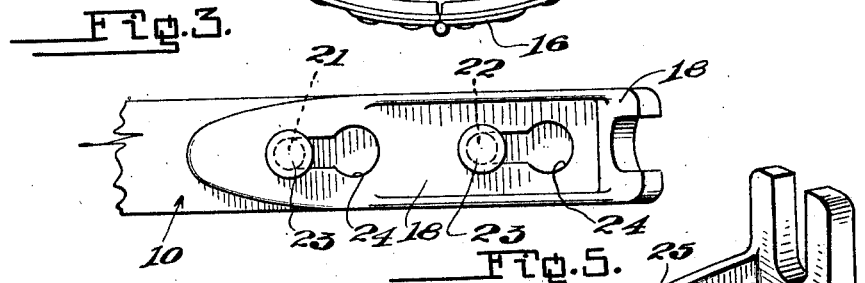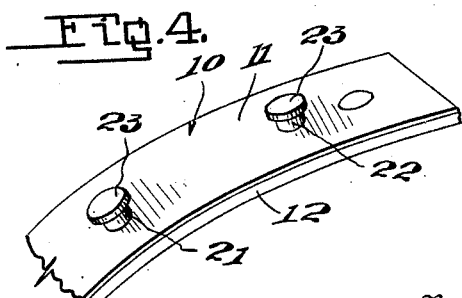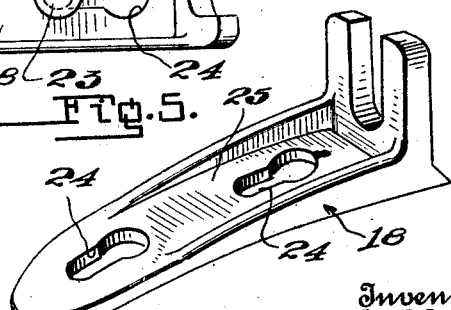

UNITED STATES PATENT OFFICE.

WILLIAM C. NEWBOLD AND GEORGE ED. LENTZ, OF CINCINNATI, OHIO.

TRANSMISSION-BAND.

1,379,647.  Specification of Letters Patent.  Patented May 31, 1921.

Application filed June 18, 1919. Serial No. 305,025.

*To all whom it may concern:*

Be it known that we, WILLIAM C. NEWBOLD and GEORGE E. LENTZ, citizens of the United States, residing at Cincinnati, in the county of Hamilton and State of Ohio, have invented certain new and useful Improvements in Transmission-Bands, of which the following is a specification.

This invention relates to transmission mechanisms of motor vehicles, and an object of the invention is to provide a transmission band which may be easily, conveniently and quickly mounted about the transmission drum of a motor vehicle.

A further object of this invention is to provide a transmission band which is composed of a plurality of hingedly connected sections, one of which sections has the usual type of coupling, rigidly connected thereto, while the coupling carried by another section is detachably connected to the said section to permit its removal during the positioning of the transmission band about the transmission drum of a motor vehicle.

Other objects of the invention will appear in the following detailed description, taken in connection with the accompanying drawings, forming a part of this specification, and in which drawings:

Figure 1 is a perspective view of the improved transmission band, showing the same being positioned about the transmission drum of a motor vehicle.

Fig. 2 is an edge elevation of the transmission band.

Fig. 3 is a fragmentary plan of the transmission band illustrating the manner of detachably connecting one of the coupling members thereto.

Fig. 4 is a detail perspective of one end of the band, illustrating the manner in which the removable coupling is attached thereto.

Fig. 5 is a perspective view of the detachable coupling, and

Fig. 6 is a side elevation of the modified form of the transmission band.

Referring more particularly to the drawings, the improved transmission band 10 is constructed of the usual materials, comprising the outer metallic band 11, having the friction material 12 attached to its inner surface which is adapted for frictional engagement with the periphery of the transmission drum A of the transmission mechanism of the motor vehicle. The band disclosed is particularly designed for use in connection with Ford automobiles or trucks, it being particularly adaptable for use in connection with motor vehicles of this type. The band 10 is composed of sections 14 and 15 which are hingedly connected, by a hinge 16, so as to allow the two sections to be swung outwardly into substantial alinement as shown in Fig. 1 of the drawings to facilitate the mounting of the transmission band about the drum A through the opening in the transmission casing B, commonly known as the inspection opening, eliminating the necessity of removing the transmission casing B to replace a worn band with a new one, which is necessary in the present construction of transmission bands, thus eliminating considerable manual labor now necessary in the placing of the transmission band about the transmission drum A, as well as materially reducing the time required for such work. The transmission band 10 has the usual type of coupling members 17, and 18 associated with its free end, which are connected by the usual coupling bolt 19, found in the construction of Ford automobiles, and which are adjusted toward or from each other by the adjusting nut 20 carried by the bolt 19. The coupling 17 is rigidly attached to the band 10, while the coupling 18 is detachably connected to the band, to permit disconnection of this coupling with the band while the band is being inserted through the inspection opening in the transmission casing B and being mounted about the transmission drum A. After the band 10 has been properly mounted about the transmission drum A and the coupling 18 properly associated with its companion bolt 19, the coupling 18 is connected to the band 10. This connection with the coupling 18 is accomplished through the medium of studs 21 and 22 carried by the band 10, which studs have the enlarged ends 26 upon their outer ends, and keyhole slots 24 formed in the arcuate attaching portion 25 of the coupling 18, thus permitting quick and easy attachment to and detachment from the band 10 of the coupling 18.

In Fig. 6 of the drawings, the band 10ª is shown as composed of three sections 11ª, 12ª and 13ª, the meeting ends of which are connected by hinges 16ª and 17ª. The operation of the modified form of the band case is identical with that of the form illustrated in Figs. 1 to 5 inclusive.

It is to be understood that the transmission 10 may be used in the transmission mechanism of a motor vehicle of the Ford type for the reverse band, slow speed band, and brake band, and in placing one of the bands about the transmission drum A, all that is necessary is to remove the inspection plate which normally closes the inspection opening C in the transmission casing B, and after the coupling 18 has been disconnected from the band 10, the end of the band from which this coupling has been removed is first passed through the inspection opening C and about the drum A and bringing the said end in normal position beneath the bolt 19, at which time the ends carrying the coupling 17 will be properly positioned.

After the band has been mounted about the transmission drum A, the coupling 18 is connected to the band which completes the operation.

Changes in details may be made without departing from the spirit of this invention, but;

We claim:

1. A transmission band for use on drums housed in casings, comprising arcuated sections, means for hingedly connecting the sections together to form a complete band, a fixed coupling member on one end of the band, and a removable coupling member on the other end of the band adapted to be removed for threading the band by swinging the sections on one another about the drum and between the same and the casing.

2. A transmission band for use on drums confined in close places, comprising a body part, a fixed coupling member on one end of the body part for determining the position of the band, and a removable coupling member on the other end of the body part adapted to be removed for threading the free end of the band about the drum.

WILLIAM C. NEWBOLD.
GEORGE ED. LENTZ.